US006831976B1

(12) United States Patent
Comerford et al.

(10) Patent No.: US 6,831,976 B1
(45) Date of Patent: Dec. 14, 2004

(54) TELEPHONE LINE-POWERED POWER SUPPLY FOR ANCILLARY EQUIPMENT AND METHOD OF OPERATION THEREOF

(75) Inventors: Timothy N. Comerford, Indianapolis, IN (US); Dale H. Nelson, Shillington, PA (US); Xiqun Zhu, Ocean, NJ (US)

(73) Assignee: Agere Systems, Inc., Allentown, PA (US)

( * ) Notice: Subject to any disclaimer, the term of this patent is extended or adjusted under 35 U.S.C. 154(b) by 0 days.

(21) Appl. No.: 09/212,533

(22) Filed: Dec. 16, 1998

(51) Int. Cl.[7] .............................................. H04M 19/08
(52) U.S. Cl. ....................................................... 379/413
(58) Field of Search .......................... 379/413; 323/242

(56) References Cited

U.S. PATENT DOCUMENTS

| | | | | |
|---|---|---|---|---|
| 4,017,686 A | * | 4/1977 | Todd | 379/422 |
| 4,197,425 A | | 4/1980 | Secrett et al. | |
| 4,709,200 A | * | 11/1987 | Ochiai | 136/293 |
| 5,612,580 A | | 3/1997 | Janonis et al. | |
| 6,089,456 A | * | 7/2000 | Walsh et al. | 235/472.01 |

FOREIGN PATENT DOCUMENTS

| | | |
|---|---|---|
| GB | 2 249 919 A | 5/1992 |
| WO | WO 95/28793 | 10/1995 |

OTHER PUBLICATIONS

Warring, R. H., Electronic Components Handbook for Circuit Designers, 1983, Tab Books, Inc., pp. 269, 272.*
Bigelow, Stephen J., Understanding Telephone Electronics, 1993, Prentice Hall Computer Publishing, pp. 160–163.*

* cited by examiner

*Primary Examiner*—Minsun Oh Harvey
*Assistant Examiner*—Daniel Swerdlow

(57) ABSTRACT

A telephone line-powered power supply, a method of operating the same and telephone line-powered ancillary equipment. In one embodiment, the power supply includes: (1) a transformer having a primary winding and a secondary winding and (2) an energy storage device (which may, but is not required to, be a capacitor) series-coupled to the primary winding, the primary winding and the energy storage device adapted to be coupled to, and provide a terminating resistance for, a telephone line. A node between the primary winding and the energy storage device provides DC power. Another embodiment employs a control switch to regulate an energy storage device, thereby dispensing with a need for the transformer.

39 Claims, 3 Drawing Sheets

TELEPHONE LINE-POWERED POWER SUPPLY FOR ANCILLARY EQUIPMENT AND METHOD OF OPERATION THEREOF

TECHNICAL FIELD OF THE INVENTION

The present invention is directed, in general, to telecommunications and, more specifically, to a telephone line-powered power supply for ancillary equipment and a method of operating the same.

BACKGROUND OF THE INVENTION

The addition of ancillary equipment to telephone systems has been increasing in both requirements and complexity primarily due to customer demands. Initially, the ancillary equipment included options such as automatic dialer circuits which typically provided memory for frequently called telephone numbers. The power supply requirements for these types of circuits are usually well within the capability of even plain old telephone systems (POTS) to provide.

Certain telephony applications, such as answering machines and speaker phones may require AC power to supply sufficient energy to the integrated circuits involved. In many earlier systems, the telephone circuits were entirely separate from the answering machine circuit. The two were joined only at the telephone line. Subsequent products used battery power as back-up for times when the AC power failed. Conventional line interface circuits provided little power to be used by any integrated circuit.

However, it is desirable in the U.S. and required in many foreign countries that if the AC power fails, the basic telephone functions of speech (speaking and hearing), network address, and alerting be maintained. This could technically be done by switching to an alternate set of circuits that are capable of providing these functions using only power from the telephone line. This approach, however, is obviously not economical. Also, conventional telephone line interface circuits which require at least a 600 ohm AC impedance do not allow much power for use in ancillary circuits.

In basic telephone line powered circuits, a common configuration is to use a diode bridge (polarity guard circuit) to guarantee voltage polarity, a switch hook (electronic or mechanical), a termination impedance as mentioned and a DC voltage-current characteristic circuit. This later circuit often consists of a bipolar transistor with an emitter degeneration resistor and a DC bias path for the base of the transistor. This DC bias path often includes the AC termination resistance of 600 to 1000 ohms, and a large capacitor to prevent attenuation of voice band signals. In this conventional circuit, starting with the required voltage-current system restriction of less than 6 volts across the telephone line with a loop current of 20 mA, we may calculate a DC power availability across the large capacitor of approximately 2.5 mA at 1.8 volts.

These values are insufficient to operate digital signal processor (DSP) or coder-decoder (CODEC) equipment. CODEC equipment converts voice signals from their analog form into digital signals acceptable to more modern digital PBXs and digital transmission systems. It then converts those digital signals back to analog so that the voice signal may be understood by the person who hears it. In some phone systems, the CODEC is in the PBX and shared by many analog phone extensions. In other phone systems, the CODEC is actually in the phone.

The maintaining of POTS capability encompasses several requirements. These include the setting of the specific DC voltage-current characteristic for the telephone line, as mentioned, while active. The AC line termination resistance of approximately 600 ohms and a bandpass frequency range of 300 to 3300 Hertz are typically required. Network addressing with dual tone multifrequency (DTMF) and pulse capability must be provided as well as alerting, the detecting of a "ringing" signal and the sounding of an "alerter".

Speech capability for POTS includes full duplex coupling to a telephone line for transmitting and receiving voice signals. The amplification of microphone signals for transmission and the amplification of the receive signal for the handset speaker is necessary. In the U.S., the speech hybrid function is defined by average loudness templates referred to as TOLR, ROLR, and SOLR which are Transmit, Receive and Sidetone Objective Loudness Ratings respectively. Transmit and Receive also have normalized frequency templates as mentioned earlier. Sidetone is a part of the design of a telephone handset which allows one to hear their own voice while speaking. Too much sidetone result in an echo and too little renders the channel unerring. Therefore, controlling the amount of microphone signal that is audible in the handset speaker is critical.

Accordingly, what is needed in the art is an economical way for a POTS architecture, during active speech mode, to provide additional current and voltage for ancillary circuits.

SUMMARY OF THE INVENTION

To address the above-discussed deficiencies of the prior art, the present invention provides a telephone line-powered power supply, a method of operating the same and telephone line-powered ancillary equipment. In one embodiment, the power supply includes: (1) a transformer having a primary winding and a secondary winding and (2) an energy storage device (which may, but is not required to, be a capacitor) coupled to the primary winding, the primary winding and the energy storage device adapted to be coupled to, and provide a terminating resistance for, a telephone line. A node between the primary winding and the energy storage device provides DC power.

The present invention therefore introduces the broad concept of substituting a conventional terminating resistor with a power supply to increase the ability of a telephone line to provide power to ancillary equipment. In alternate embodiments, the power supply can include a transformer or be transformerless. "Ancillary equipment" is defined, for purposes of the present invention, as equipment that requires electric power. "Ancillary equipment" includes, but is not limited to, signal processing or other electronic circuitry located within a telephone and answering, caller identification or other equipment that a user may want to locate near a telephone. "Ancillary equipment" may be powered by the telephone line only as required or may be powered regardless of the availability of alternative power.

In one embodiment of the present invention, the power supply further includes a line transformer interface coupled to the secondary winding. The line transformer interface, which is not necessary to the present invention, provides a signal interface for signals derived from or supplied to the secondary winding. Ancillary equipment, such as signal processors, may employ a line transformer interface to communicate via the telephone line.

In one embodiment of the present invention, the power supply further includes a diode series-coupled to the primary winding. The diode can protect other components in the power supply from receiving discharges from the energy storage device.

In one embodiment of the present invention, the power supply further includes an activation switch couplable to the telephone line and functioning based on a hookstate. A "hookstate" is literally the state of the telephone's hook: "off-hook or "on-hook." The ancillary equipment senses the voltage of an alternative source of electric power and enables the power supply with the activation switch when the alternative source of electric power is interrupted.

In one embodiment of the present invention, the power supply further includes a line voltage sense circuit couplable to the telephone line. The voltage circuit allows the voltage of the telephone line to be determined. The line voltage sense circuit is used by the ancillary equipment to bias and control other circuits necessary for proper telephone operation.

In one embodiment of the present invention, the power supply further includes a filter coupled to the secondary winding. The filter, while not necessary to the present invention, is desirable in some applications to smooth signals associated with the secondary winding.

In one embodiment of the present invention, the power supply further includes a power fail ringing circuit couplable to the telephone line. The power fail ringing circuit, if present, provides ringing signals in the event of an interruption of an alternative source of electric power.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
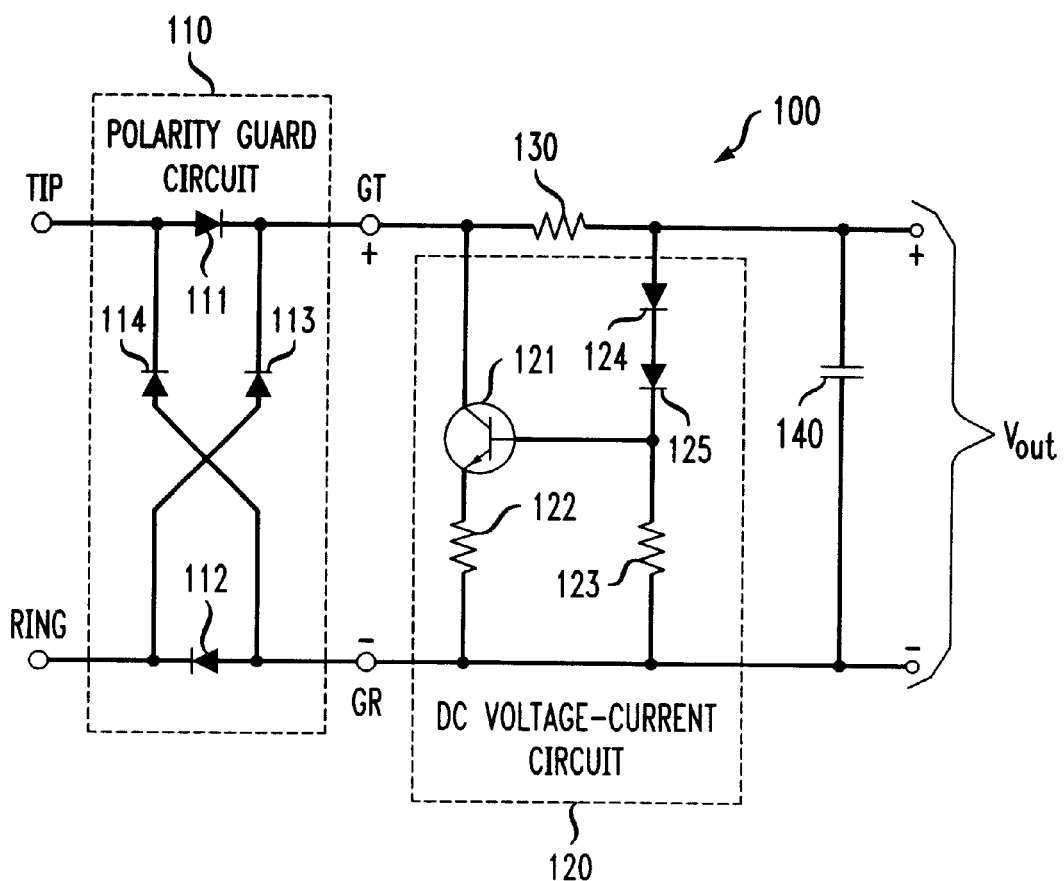
FIG. 1 illustrates a schematic diagram of a conventional telephone circuit which may be used to provide power to some types of ancillary equipment.

Referring initially to FIG. 1, illustrated is a schematic diagram of a conventional telephone circuit 100 which may be used to provide power to some types of ancillary equipment. The telephone circuit 100 includes a polarity guard circuit 110, a DC voltage-current (DC V-I) circuit 120, an AC terminating resistor 130 and a filter capacitor 140 which provides a DC voltage (Vout) as shown.

The polarity guard circuit 110 includes diodes 111, 112, 113, and 114 arranged in a diode bridge configuration. Tip and ring DC voltage inputs to the polarity guard circuit 110 may adopt either polarity (e.g., tip positive and ring negative, or tip negative and ring positive) and the guarded output voltage (GT, GR) polarity of the polarity guard circuit 110 remains substantially constant, as shown. Originally, tip had a positive polarity and ring had a negative polarity. As wiring installations became more complex, maintaining this convention became more difficult. Additionally, some current systems now reverse the tip and ring polarity between the dial and talk modes of operation. Maintaining a proper polarity has therefore become critical for electronic telephones.

The DC V-I circuit 120 includes a transistor 121, first and second resistors 122, 123 and first and second diodes 124, 125. The DC V-I circuit 120 provides a required POTS voltage versus current characteristic waveform. The first and second diodes 124, 125 and the second resistor 123 form a DC bias network for the transistor 121 employing the first resistor 122. The DC current flowing through the transistor 121 is basically the voltage applied to its base terminal divided by the resistance of the first resistor 122 (neglecting the transistor's base-to-emitter voltage drop).

An output voltage (Vout) is provided by the junction of a third resistor 130 with the series circuit elements of the first and second diode 124, 125 and the second resistor 123. A capacitor 140 constitutes a filter element for the voltage Vout. Typically, the capacitor 140 has a value of at least 470 microfarads. The third resistor 130 also functions as the AC terminating resistance for the telephone line and typically has a value of 600 to 1000 ohms. A terminating resistance of this value limits the amount of DC current that may be provided to ancillary equipment, since many types of ancillary equipment require that Vout be no less than 3 volts to function properly.

Figure 2:
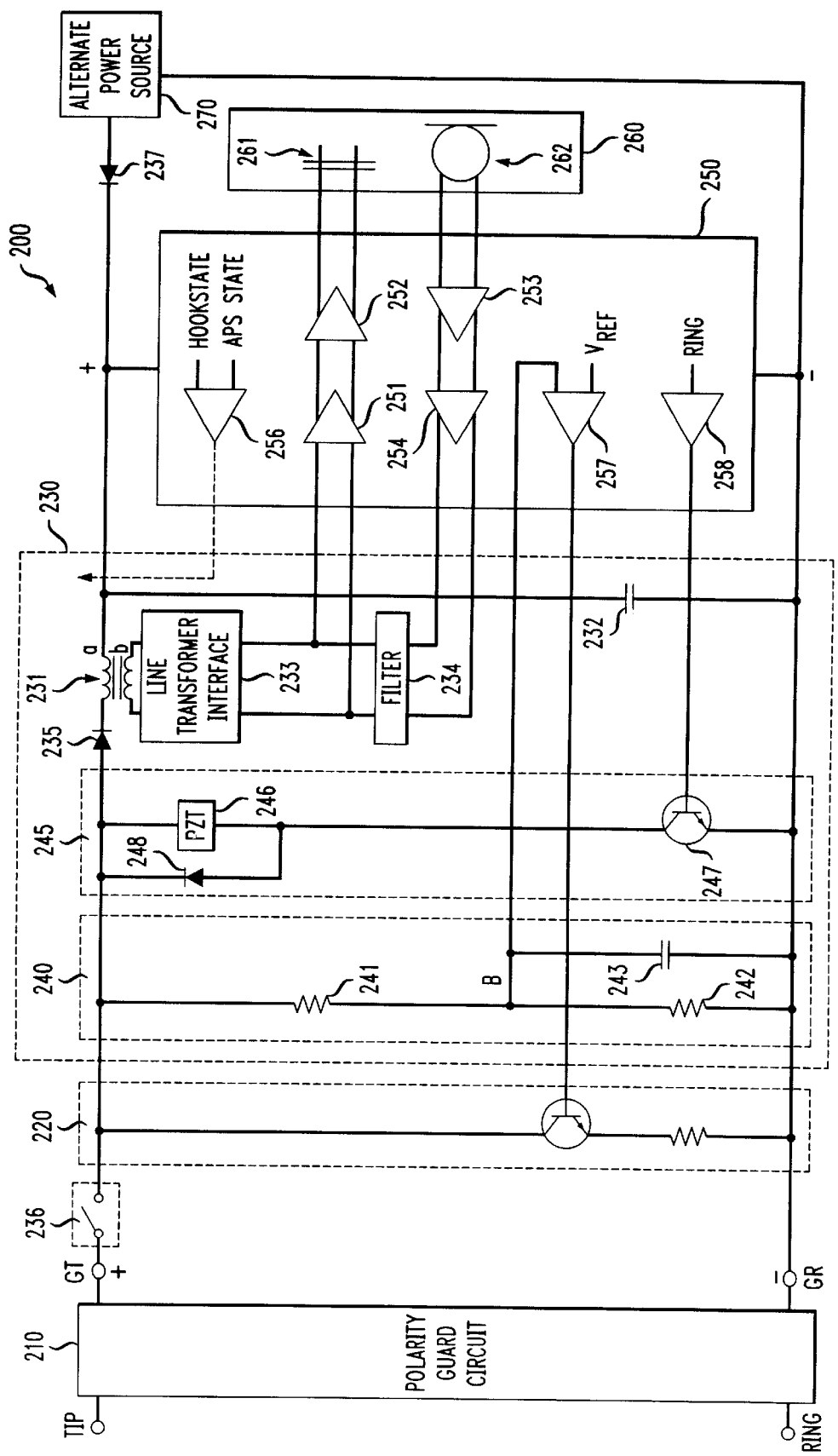
FIG. 2 illustrates a schematic diagram of a telephone circuit showing an embodiment of an improved telephone line-powered power supply for ancillary equipment.

Turning now to FIG. 2, illustrated is a schematic diagram of a telephone circuit 200 showing an embodiment of an improved telephone line-powered power supply for ancillary equipment. The telephone circuit 200 is couplable to a telephone line (which is environmental and therefore not shown) and includes a polarity guard circuit 210, a DC V-I circuit 220, a telephone line-powered power supply 230, a signal processor 250, a telephone handset 260 and an alternate power source 270. The polarity guard circuit 210 and the DC V-I circuit 220 perform the same functions as described in FIG. 1. However, bias-setting and control for the DC V-I circuit 220 is provided by the ancillary equipment, as will be described below.

The telephone line-powered power supply 230 includes an AC to DC energy transfer device (shown as a transformer 231 having a primary winding 231a and a secondary winding 231b) and an energy storage device 232 (shown as being a capacitor in this embodiment, but is not required to be a capacitor) coupled to the primary winding 231a. The primary winding 231a provides an AC terminating resistance for the telephone line via a reflected resistance from the transformer secondary 231b. This allows the DC resistance of the transformer winding 231a to be made as low as practical, providing increased capability to deliver DC power supply current to the energy storage device 232 coupled to a node A between the primary winding 231a and the energy storage device 232 and thereby providing DC power to the ancillary equipment. The power supply 230 also includes a diode 235 which is series-coupled to the primary winding 231a. The diode 235 can protect other components in the power supply 230 from receiving discharges from the energy storage device 232. A diode 237 further isolates the power supply 230 from the alternate power source 270 which normally provides DC power to the ancillary equipment signal processor 250.

The present invention therefore introduces the broad concept of substituting a conventional terminating resistor with a power supply to enhance the ability of a telephone line to provide power to ancillary equipment. Ancillary equipment, in general, may perform as many additional functions as may be required or desired, subject to the availability of appropriate technology and the power required for its proper operation. In this embodiment, the signal processor 250 provides analog and digital signal conditioning between the telephone line and the telephone handset functions 260 of hearing (via a speaker 261) and speaking (via a microphone 262). For hearing, the signal processor 250 may provide a programmable gain amplifier (PGA) 251 coupled to a speaker driver amplifier 252 which then drives the speaker 261. For speaking, the microphone 262 may drive a microphone amplifier 253 coupled to a line driver circuit 254 provided by the signal processor 250, as shown. Additionally, the signal processor 250 provides other functions in the illustrated embodiment, as will be discussed.

In this embodiment of the present invention, the power supply 230 further includes a line transformer interface 233 coupled to the secondary winding 231b. The line transformer interface 233, while not necessary to the present invention, provides a signal interface for signals derived from or supplied to the secondary winding 231b. Ancillary equipment, such as the signal processor 250, may employ a line transformer interface 233 to communicate via the telephone line. The power supply 230 further includes a filter 234 coupled to the secondary winding 231b. The filter, while also not necessary to the present invention, is desirable in some applications to smooth signals associated with the secondary winding.

In the illustrated embodiment, the telephone circuit 200 includes an activation switch 236 couplable to the telephone line and functioning based on a hookstate supplied by a first reference amplifier 256 of the signal processor 250. Again, a "hookstate" is defined literally as the state of the telephone's hook: "off-hook" or "on-hook." Of course, the hookstate signal could alternately be supplied from a mechanical hook switch. At initial activation, the activation switch 236 may be in its closed position, to assure proper power-up of the ancillary equipment, until the state of the alternate power source 270 is determined. The activation switch 236 would then typically open if the alternate power source 270 is found to be operational.

The power supply 230 also includes a line voltage sense circuit 240, if needed, that is couplable to the telephone line. The line voltage sense circuit 240 includes first and second resistors 241, 242 and a filter capacitor 243. The voltage circuit 240 allows the voltage of the telephone line to be determined by providing a portion of the total telephone line voltage (which is resident at node B) to a second reference amplifier 257 in the signal processor 250. The second reference amplifier 257 is used to provide the bias-setting and control for the DC V-I circuit 220 by comparing the voltage at node B to a reference voltage and adjusting the bias for the DC V-I circuit 220 as required.

In the illustrated embodiment, the power supply 230 includes an optional power fail ringing circuit 245 couplable to the telephone line. The power fail ringing circuit 245 provides ringing signals in the event of an interruption of an alternative source of electric power. The power fail ringing circuit 245 includes a piezoelectric transducer (PZT) 246, a switching device 247 and a diode 248. A driver circuit 258 in the signal processor 250 provides an input to the switching device 247, causing it to turn ON and OFF. This action applies a repetitive voltage across the PZT 246, causing it to "ring." The diode 248 suppresses unwanted transients. In this embodiment, the diode 248 may be a conventional device or a light-emitting diode (LED) that also provides for visual, as well as audible, ringing via the PZT transducer 246.

Figure 3:
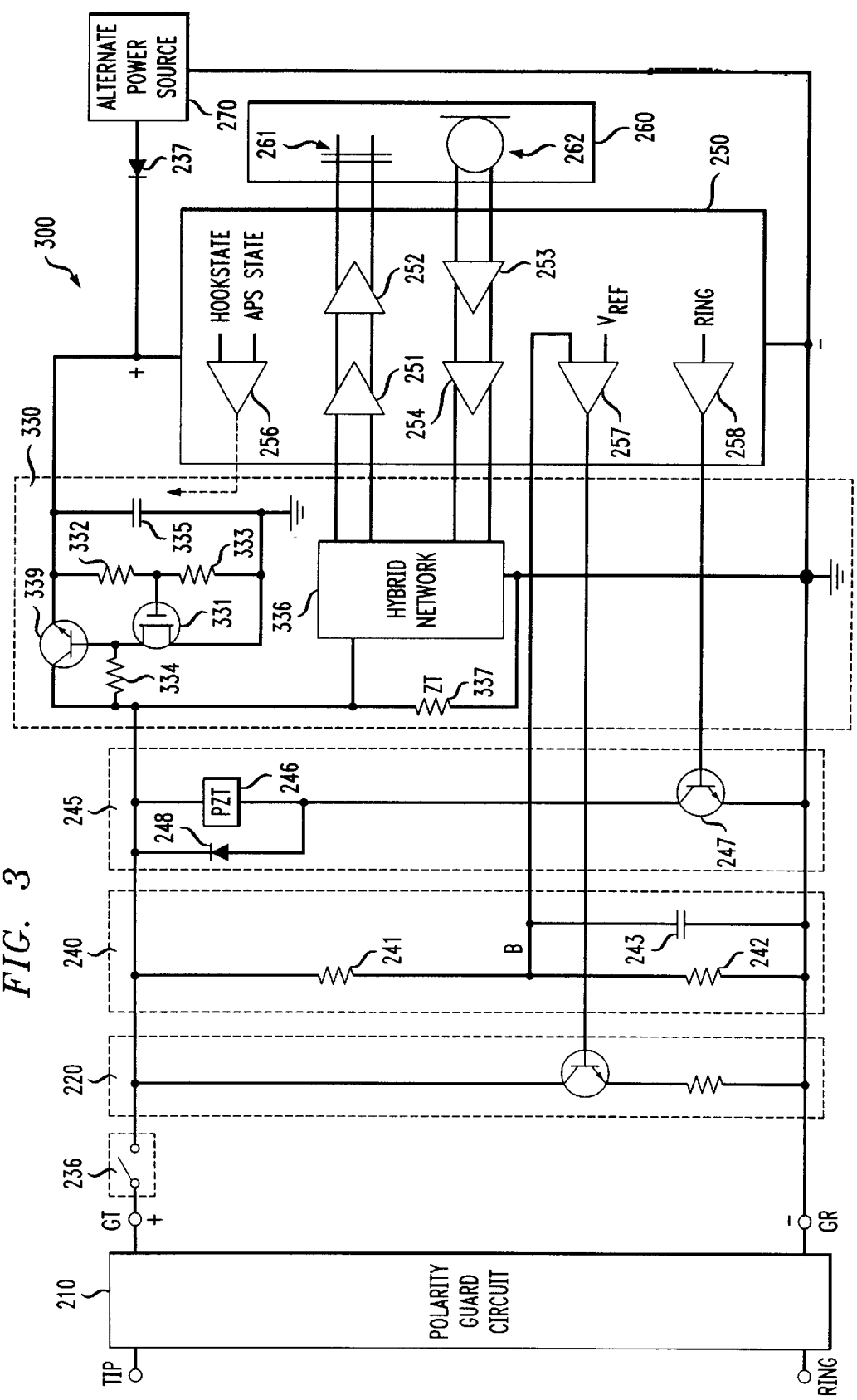
FIG. 3, illustrates a schematic diagram of a telephone circuit showing an alternate embodiment of an improved telephone line-powered power supply for ancillary equipment.

Turning now to FIG. 3, illustrated is a schematic diagram of a telephone circuit 300 showing an alternate embodiment of an improved telephone line-powered power supply for ancillary equipment. The telephone circuit 300 is couplable to a telephone line (which is environmental and therefore not shown) and includes a polarity guard circuit 210, a DC V-I circuit 220, a telephone line-powered power supply 330, a line voltage sense circuit 240, a power fail ringing circuit 245, a signal processor 250, a telephone handset 260 and an alternate power source 270.

The polarity guard circuit 210, the DC V-I circuit 220, the line voltage sense circuit 240 the power fail ringing circuit 245, the signal processor 250, the telephone handset 260 and the alternate power source 270 perform the same functions as described in FIG. 1 and FIG. 2 respectively. The structure and operation of the alternate embodiment of the telephone line-powered power supply 330 will now be described. The telephone line-powered power supply 330 includes a power switch 339, a control switch 331, first, second and third resistors 332, 333, 334, a filter capacitor 335, a hybrid network 336 and a terminating impedance 337.

Initially, the filter capacitor 335 is discharged and both the power switch 339 and the control switch 331 are OFF (not conducting). When an activation switch 236 coupled to the power switch 339 closes, DC voltage from the point GT causes the power switch 339 to turn ON by forward biasing its base-emitter junction through the third resistor 334. This action causes the voltage across the filter capacitor 335 to increase and supplies power to the signal processor 250. This voltage increase continues until the voltage across the filter capacitor 335 reaches a voltage Vreg, which is the desired value of the output voltage. At this point the control switch 331 turns ON, causing the power switch 339 to turn OFF. As the output voltage decreases below the voltage Vreg, a voltage point is reached which turns the control switch 331 OFF and allows the power switch 339 to again turn ON thereby completing a regulating cycle.

The value of the third resistor 334 may be chosen to be sufficiently large enough not to affect the AC line impedance, which may then be determined by the hybrid network 336 and selection of the terminating impedance 337. Additionally, values for the first and second resistors 332, 333 may also be chosen to be sufficiently large enough to divert only a small amount of the output current of the telephone line-powered power supply 330 from the load.

Although the present invention has been described in detail, those skilled in the art should understand that they can make various changes, substitutions and alterations herein without departing from the spirit and scope of the invention in its broadest form.

What is claimed is:

1. A telephone line-powered power supply, comprising:
   a transformer having a primary winding and a secondary winding; and
   an energy storage device series-coupled directly to said primary winding, said primary winding and said energy storage device adapted to be coupled to, and provide a terminating resistance for, a telephone line, a node between said primary winding and said energy storage device providing DC power.

2. The power supply as recited in claim 1 further comprising a line transformer interface coupled to said secondary winding.

3. The power supply as recited in claim 1 further comprising a diode series-coupled to said primary winding.

4. The power supply as recited in claim 1 further comprising an activation switch couplable to said telephone line and functioning based on a hookstate.

5. The power supply as recited in claim 1 further comprising a line voltage sense circuit couplable to said telephone line.

6. The power supply as recited in claim 1 further comprising a filter coupled to said secondary winding.

7. The power supply as recited in claim 1 further comprising a power fail ringing circuit couplable to said telephone line.

8. A method of supplying power to ancillary equipment from a telephone line, comprising:
   terminating said telephone line with a transformer and energy storage device directly coupled in series, said transformer having a primary winding and a secondary winding; and
   deriving DC power for said ancillary equipment from a node between said primary winding and said energy storage device.

9. The method as recited in claim 8 further comprising communicating signals between said secondary winding and said ancillary equipment with a line transformer interface coupled to said secondary winding.

10. The method as recited in claim 8 further comprising rectifying currents through said transformer with a diode series-coupled to said primary winding.

11. The method as recited in claim 8 further comprising selectively enabling an activation switch couplable to said telephone line based on a hookstate.

12. The method as recited in claim 8 further comprising sensing a voltage of said telephone line with a line voltage sense circuit couplable to said telephone line.

13. The method as recited in claim 8 further comprising filtering signals derived from said secondary winding with a filter coupled to said secondary winding.

14. The method as recited in claim 8 further comprising supplying a ringing signal with said ancillary equipment to a power fail ringing circuit couplable to said telephone line.

15. Telephone line-powered ancillary equipment, comprising:
   a power supply, including:
   a transformer having a primary winding and a secondary winding, and
   an energy storage device series-coupled directly to said primary winding, said primary winding and said energy storage device adapted to be coupled to, and provide a terminating resistance for, a telephone line; and
   a load, coupled to a node between said primary winding and said energy storage device to derive DC power from said power supply.

16. The ancillary equipment as recited in claim 15 wherein said power supply further includes a line transformer interface coupled between said secondary winding and said load.

17. The ancillary equipment as recited in claim 15 wherein said power supply further includes a diode series-coupled to said primary winding.

18. The ancillary equipment as recited in claim 15 wherein said power supply further includes an activation switch couplable to said telephone line and functioning based on a hookstate.

19. The ancillary equipment as recited in claim 15 wherein said power supply further includes a line voltage sense circuit coupled between said telephone line and said load.

20. The ancillary equipment as recited in claim 15 wherein said power supply further includes a filter coupled between said secondary winding and said load.

21. The ancillary equipment as recited in claim 15 wherein said power supply further includes a power fail ringing circuit coupled between said telephone line and said load.

22. A telephone line-powered power supply, comprising:
   a control switch;
   an energy storage device parallel-coupled to said control switch;
   resistors, coupled to said control switch and said energy storage device, that controls said control switch based on a voltage of said energy storage device to regulate said voltage, wherein said resistors are sufficiently sized not to affect an impedance of said telephone line; and
   a terminating impedance, coupled to said control switch, that provides a terminating resistance for said telephone line.

23. The power supply as recited in claim 22 further comprising a power switch that initially charges said energy storage device.

24. The power supply as recited in claim 22 wherein said resistors are first, second and third resistors.

25. The power supply as recited in claim 22 further comprising an activation switch couplable to said telephone line and functioning based on a hookstate.

26. The power supply as recited in claim 22 further comprising a line voltage sense circuit couplable to said telephone line.

27. The power supply as recited in claim 22 further comprising a power fail ringing circuit couplable to said telephone line.

28. A method of supplying power to ancillary equipment from a telephone line, comprising:
   activating a control switch;
   charging an energy storage device parallel-coupled to said control switch;
   controlling said control switch employing resistors coupled to said energy storage device and said control switch based on a voltage of said energy storage device to regulate said voltage, wherein said resistors are sufficiently sized not to affect an impedance of said telephone line; and
   providing a terminating resistance for said telephone line.

29. The method as recited in claim 28 further comprising initially charging said energy storage device.

30. The method as recited in claim 28 wherein said controlling said control switch based on a voltage of said energy storage device includes controlling said control switch using first, second and third resistors.

31. The method as recited in claim 28 further comprising selectively enabling an activation switch couplable to said telephone line based on a hookstate.

32. The method as recited in claim 28 further comprising sensing a voltage of said telephone line with a line voltage sense circuit couplable to said telephone line.

33. The method as recited in claim 28 further comprising supplying a ringing signal with said ancillary equipment to a power fail ringing circuit couplable to said telephone line.

34. Telephone line-powered ancillary equipment, comprising:
   a power supply, including:
   a control switch,
   an energy storage device parallel-coupled to said control switch, resistors, coupled to said control switch and said energy storage device, that controls said control switch based on a voltage of said energy storage device to regulate said voltage, wherein said resistors are sufficiently sized not to affect an impedance of a telephone line, and a terminating impedance, coupled to said control switch, that provides a terminating resistance for said telephone line; and a load, coupled to said energy storage device to derive DC power from said power supply.

35. The power supply as recited in claim 34 wherein said power supply further includes a power switch that initially charges said energy storage device.

36. The ancillary equipment as recited in claim 34 wherein said resistors are first, second and third resistors.

37. The ancillary equipment as recited in claim 34 wherein said power supply further includes an activation switch couplable to said telephone line and functioning based on a hookstate.

38. The ancillary equipment as recited in claim 34 wherein said power supply further includes a line voltage sense circuit couplable to said telephone line.

39. The ancillary equipment as recited in claim 34 wherein said power supply further includes a power fail ringing circuit couplable to said telephone line.

* * * * *